(12) United States Patent
Bavant et al.

(10) Patent No.: US 7,697,424 B2
(45) Date of Patent: Apr. 13, 2010

(54) METHOD AND DEVICE TO TRANSFER DATA IN A COMMUNICATION NETWORK COMPRISING A LOW-BIT RATE ARTERY

(76) Inventors: Marc Bavant, 21, rue Clavel, 75019 Paris (FR); Bruno Calvet, 1, rue Charpy, 94000 Creteil (FR); Barbara Combe, 19, rue Pasteur, 92270 Bois-Colombes (FR); Luc Loiseau, 6, rue Gabriel Péri, 78210 St Cyr l'Ecole (FR)

( * ) Notice: Subject to any disclaimer, the term of this patent is extended or adjusted under 35 U.S.C. 154(b) by 1297 days.

(21) Appl. No.: 10/083,128

(22) Filed: Feb. 27, 2002

(65) Prior Publication Data
US 2002/0131420 A1  Sep. 19, 2002

(30) Foreign Application Priority Data
Feb. 27, 2001  (FR) .................................. 01 02654

(51) Int. Cl.
*H04L 12/56* (2006.01)
(52) U.S. Cl. .................... 370/230; 370/395.6; 370/421; 370/428
(58) Field of Classification Search ................ 370/235, 370/395.2, 395.43, 536, 537, 395.6, 428, 370/230, 316, 474, 395.32, 236.2, 395.7
See application file for complete search history.

(56) References Cited

U.S. PATENT DOCUMENTS

| | | | | |
|---|---|---|---|---|
| 4,641,318 A | * | 2/1987 | Addeo | 375/260 |
| 4,829,227 A | * | 5/1989 | Turner | 370/422 |
| 4,860,308 A | * | 8/1989 | Kamerman et al. | 375/222 |
| 5,724,354 A | * | 3/1998 | Tremel et al. | 370/236.2 |
| 5,777,764 A | * | 7/1998 | Kohn | 398/178 |

(Continued)

FOREIGN PATENT DOCUMENTS

EP   0 942 617   9/1999

(Continued)

OTHER PUBLICATIONS

Inverse multiplexing; Duncanson, J. Ascend Commun. Inc.; This paper appears in: Communications Magazine, IEEE Publication Date: Apr. 1994 vol. 32, Issue: 4 On pp. 34-41.*

(Continued)

*Primary Examiner*—Salman Ahmed
(74) *Attorney, Agent, or Firm*—Christensen O'Connor Johnson Kindness PLLC

(57) ABSTRACT

In a method for the conveying of data between several users A, B, in a communications network comprising at least one low-bit-rate artery and one or more standard-bit-rate arteries, the network comprises a basic transmission unit, such as a cell, and at least one adaptation layer protocol, the data to be transmitted taking the form of packets Pi having a size smaller then the size of the basic transmission unit, the method comprising at least the following steps:
 extracting the packets Pi from the upstream and/or downstream cells of a low-bit-rate artery (steps (4a) or (5a)),
 inserting said packets according to a given adaptation layer protocol, in the cells of a virtual circuit set up between the ends of the low-bit-rate artery (steps (4b)), or between the users (steps (5b) and (5c)).

22 Claims, 4 Drawing Sheets

U.S. PATENT DOCUMENTS

| | | | | |
|---|---|---|---|---|
| 5,946,300 | A * | 8/1999 | Wilbrod | 370/241 |
| 6,061,354 | A * | 5/2000 | Morikawa et al. | 370/395.7 |
| 6,069,922 | A * | 5/2000 | Dyke | 375/285 |
| 6,134,246 | A * | 10/2000 | Cai et al. | 370/474 |
| 6,222,858 | B1 * | 4/2001 | Counterman | 370/474 |
| 6,330,228 | B1 | 12/2001 | Bavant | |
| 6,339,488 | B1 * | 1/2002 | Beshai et al. | 398/59 |
| 6,580,723 | B1 * | 6/2003 | Chapman | 370/442 |
| 6,590,909 | B1 * | 7/2003 | Stacey et al. | 370/537 |
| 6,594,266 | B1 * | 7/2003 | Kim | 370/395.6 |
| 6,606,302 | B2 * | 8/2003 | Delattre et al. | 370/230.1 |
| 6,819,658 | B1 * | 11/2004 | Agarwal et al. | 370/316 |
| 6,950,446 | B2 * | 9/2005 | McClary et al. | 370/503 |
| 6,963,570 | B1 * | 11/2005 | Agarwal | 370/395.32 |
| 6,973,128 | B2 * | 12/2005 | Zhou et al. | 375/240.11 |
| 7,003,794 | B2 * | 2/2006 | Arye | 725/100 |
| 7,120,154 | B2 * | 10/2006 | Bavant et al. | 370/395.53 |
| 7,394,850 | B1 * | 7/2008 | Gordon | 375/240.01 |
| 7,400,637 | B1 * | 7/2008 | Chapman | 370/403 |
| 7,400,657 | B2 * | 7/2008 | Somashekhar et al. | 370/535 |
| 2006/0133386 | A1 * | 6/2006 | McCormack et al. | 370/395.52 |

FOREIGN PATENT DOCUMENTS

| | | |
|---|---|---|
| EP | 0 942 617 A2 | 9/1999 |
| WO | WO 99/05881 | 2/1999 |

OTHER PUBLICATIONS

Generalized inverse multiplexing of switched ATM connections; Chiussi, F.M. Khotimsky, D.A. Krishnan, S. Lucent Technol., AT&T Bell Labs., Holmdel, NJ ; This paper appears in: Global Telecommunications Conference, 1998. GLOBECOM 98.*

A study of the inverse multiplexing for ATM (IMA) protocol; Isnard, O. Calmel, J.-M. Beylot, A.-L. Pujolle, G. Nortel Networks-Wireless Solutions, Yvelines; This paper appears in: High Performance Switching and Routing, 2000. ATM 2000.*

Implementing inverse multiplexing for ATM; Pires, A. Mitel Semicond., Kanata, Ont.; This paper appears in: ATM, 1999. ICATM '99. 1999 2nd International Conference on Publication Date: 1999 On pp. 340-345 Meeting Date: Jun. 21, 1999-Jun. 23, 1999.*

S. H. Zhou, et al., Vehicular Technology Conference, $48^{TH}$ IEEE, pp. 2527-2531, "Bypassing Vocoders in CDMA Mobile-To-Mobile Calls", May 18, 1998.

Pending U.S. Appl. No. 09/175,478, filed Oct. 20, 1998.
Pending U.S. Appl. No. 09/147,511, filed Jan. 12, 1999.
Pending U.S. Appl. No. 09/147,667, filed Feb. 10, 1999.
Pending U.S. Appl. No. 09/284,248, filed Apr. 15, 1999.
Pending U.S. Appl. No. 09/530,948, filed May 15, 2000.
Pending U.S. Appl. No. 09/895,324, filed Jul. 2, 2001.
Pending U.S. Appl. No. 10/083,128, filed Feb. 27, 2002.
Zhou, S.H., et al., "Bypassing Vocoders in CDMA Mobile-to-Mobile Calls," 48th IEEE Vehicular Technology Conference (VTC 98), May 18-21, 1998, Ottawa, pp. 2527-2531.

\* cited by examiner

METHOD AND DEVICE TO TRANSFER DATA IN A COMMUNICATION NETWORK COMPRISING A LOW-BIT RATE ARTERY

BACKGROUND OF THE INVENTION

1. Field of the Invention

The present invention relates to the field of data transmission in communications networks comprising one or more low-bit-rate arteries or comprising arteries with low-bit-rate channels.

The invention can be applied especially in the field of telecommunications and relates more particularly to a method to implement the AAL2 (ATM Adaptation Layer 2) protocols for conveying data within an ATM (asynchronous transfer mode) switching network comprising one or more low-bit-rate arteries.

It is used for example in networks comprising lines using satellite links, radio or any other type of links where the bandwidth resources may be highly limited.

It can be applied for example in all networks providing different services such as telephony, voice communications, fax, and data transmission by modem.

ATM networks have been designed for the high-bit-rate conveying of multiservice data (voice, video, data, etc.). They switch fixed-length cells comprising 48-byte payloads.

2. Description of the Prior Art

To this end, in the earliest implementation of ATM telephone services, it was sought to recreate a service comparable to that provided by synchronous public switching networks. The voice is digitized at 64 kbits/s. The ATM cells are filled sequentially with 47 speech samples and with one additional byte giving a sequence number that authorizes the detection of cell losses, thus enabling the generation of replacement noise for lost information. This implementation is known as the AAL1 (ATM Adaptation Layer 1) standardized by the ITU in its recommendation [1.363.1] of 1996 (ITU specification for the AAL type 2 ISDN-LB ATM adaptation layer).

Subsequently, in 1997, the ITU standardized a new adaptation layer (AAL2) dedicated to the transmission, in an ATM network, of variably sized application packets at low bit rates in its recommendation [I.363.2] (ITU specification for the AAL type 2 ISDN-LB ATM adaptation layer). This new protocol is more specifically designed for the real-time services which make use of efficient compression techniques. Video compression was an application commonly envisaged for this adaptation layer since the bit rates needed for full-band video meant that it was not possible to envisage any commercially viable operation. Another useful application of the adaptation layer pertains to the creation of trunking between small numbers of local telephone networks or private automatic branch exchanges (PABX)

Compression techniques produce packets of variable length with a relatively low bit rate. The AAL2 adaptation layer is used to convey these packets in ATM cells while offering the possibility that several packets will be in the same cell or that the packets will be split into two parts conveyed in consecutive cells at the time of transmission.

In certain fields of application, subject to operational constraints, the bandwidth used may be reduced and the ATM network arteries have a low bit rate, for example 2 Mbit/s, as compared with the usual bit rates which are in the range of 50, 155 or 622 Mbits/s. Furthermore, considering the requirements of connectivity between remote regions and a metropolitan area call for low-bit-rate links, for example 64 kbits/s, especially by satellite, voice transmission still takes up a major proportion of the transmission in these networks, and it has been necessary to use voice encoding techniques that are more economical in terms of bandwidth than the civilian PCM (pulse code modulation) technique according to the [G.711] recommendation working at 64 kbits/s, as is the case for example with the 16 bits/s Delta encoding system.

At the same time, the development of requirements in the field of civilian communications has led to the emergence of even more efficient techniques of voice encoding and compression: this is especially the case with the compression techniques implemented in GSM mobile telephony networks, or again with the technique of encoding at 5.3 kbits/s specified in the ITU [G.723.1] recommendation (this is a dual rate speech coder standard for multimedia communications transmitting at 5.3 and 6.3 kbit/s) and used in IP (Internet Protocol) voice communications.

In telephone communications compressed by a [G.723.1] type algorithm in a network where certain arteries are low-bit-rate arteries, the initial data, which have a certain length, take the form of small-sized frames after compression. For example, the frames that come out of a vocoder are small-sized frames (typically, 1, 4 or 20 bytes) but correspond to a duration of speech that is long (typically: 30 ms). To use the bandwidth with the utmost efficiency, it is possible to consider placing several of these frames in an ATM cell, but a great deal of time is needed to fill the cell before it can be sent. This will create a high latency time that may impair the subjective quality of the communications or may result in inconvenient echo phenomenal.

One way to get around this obstacle would be to multiplex several distinct calls in one and the same ATM virtual circuit. For example, if two calls are simultaneously active, it is possible to place a frame of one call and a frame of the other call in each ATM cell. This allows the cell to be sent within half the time that is needed when only one call is active. However, this possibility of multiplexing requires that both calls should be made between the same pair of access points of the ATM network. This is not the most usual situation.

In general, the idea of the invention consists in optimizing the transfer of data in a communication network comprising one or more low-bit-rate arteries, wherein the data, when compressed, takes the form of frames whose size is smaller than the size of the basic transmission unit, for example a cell, and the network implements an adaptation layer type of protocol to distribute and multiplex the small-sized frames in a fixed-size packet in order to route them in the network.

The Idea of the Invention consists, for example, in shaping certain data, especially upstream to the low-bit-rate arteries or at the entry to lines comprising one or more low-bit-rate channels and in conveying the data in a network of this kind.

In this description, the expression "low-bit-rate arteries" designates either a low-bit-rate arteries or an arteries comprising one or more low-bit-rate channels.

The communications network is characterized especially by means of a basic transmission unit, for example a cell or a fixed-size container such as an ATM cell or an adaptation protocol or an adaptation layer protocol.

When applied to the AAL2 protocol, the invention relates to a specific implementation of this AAL2 protocol which optimizes the padding of the cells on the low-bit-rate channels without, however, introducing any excessive delay in telephone communications.

The invention also comprises a component related to the search for a route passing through the units capable of carrying out this implementation of the AAL2 protocol and a component related to the detection of information losses in order to manage a piece of conventional substitute information in order to maintain binary integrity or synchronism.

The terms "upstream" and "downstream" are considered with respect to a direction of circulation of data in the network.

SUMMARY OF THE INVENTION

The invention relates to a method for the conveying of data between several users A, B, in a communications network comprising at least one low-bit-rate artery and one or more arteries working at standard bit rates, the network comprising a basic transmission unit, such as a cell, and at least one adaptation layer protocol, the data to be transmitted taking the form of packets Pi having a size smaller then the size of the basic transmission unit. The method comprises at least the following steps:

Extracting the packets Pi from the upstream and/or downstream cells of a low-bit-rate artery (steps (4a) or (5a)), Inserting said packets according to a given adaptation layer protocol, in the cells of a virtual circuit set up between the ends of the low-bit-rate artery (steps (4b)), or between the users (steps (5b) and (5c)).

It may comprise a multiplexing of data from a same user or from different users, upstream to the low-bit-rate artery and/or a demultiplexing operation downstream from the low-bit-rate artery.

According to one mode of implementation, the cells are diverted before the steps of extraction (step (4a)) and insertion (step (4b)) and the cells coming from the step (5c) are injected into virtual circuits set up among users.

The adaptation layer protocol used especially to insert packets is, for example, the AAL2 protocol.

The invention also relates to a device for data switching between several users A, B for a communications network comprising at least one low-bit-rate artery, the network comprising a basic transmission unit, such as a cell, and supporting at least one adaptation layer protocol. The device comprises at least one multiplexer device adapted to the switching of packets Pi conveyed in the cells according to the adaptation protocol among several virtual arteries constituted by connections in multiplexed or non-multiplexed mode.

The device may comprise the following elements:

a shuffler to transmit a cell to the multiplexer and carry out a transparent switching of the cells that do not have to travel through a low-bit-rate artery, a means to extract the packets Pi from the cells travelling through a low-bit-rate artery and for cell packetization for each virtual artery, a means for the shunting of the packets received from the means and a table adapted to determining the cell exit virtual artery.

The invention furthermore relates to a network to convey data among several users A, B, the network comprising one or more low-bit-rate arteries and one or more standard-bit-rate arteries, at least one adaptation layer protocol and one basic transmission unit such as a cell, wherein the network comprises at least one switching device having at least one of the above characteristics, this device being positioned upstream to and/or downstream from a low-bit-rate artery, The network also comprises several ATM switches.

The method and the device according to the invention offer, in particular, the advantage of optimizing the conveyance of vocoded telephone data within an ATM switching network comprising one or more low-bit-rate arteries.

The multiplexing of vocoded frames in one and the same cell is applied solely where there is no risk of increasing the latency time.

BRIEF DESCRIPTION OF THE DRAWINGS

Other advantages and features of the invention shall appear more clearly from the following description of exemplary embodiments, given by way of an illustration and made with reference to the appended drawings, of which.

MORE DETAILED DESCRIPTION

Figure 1:
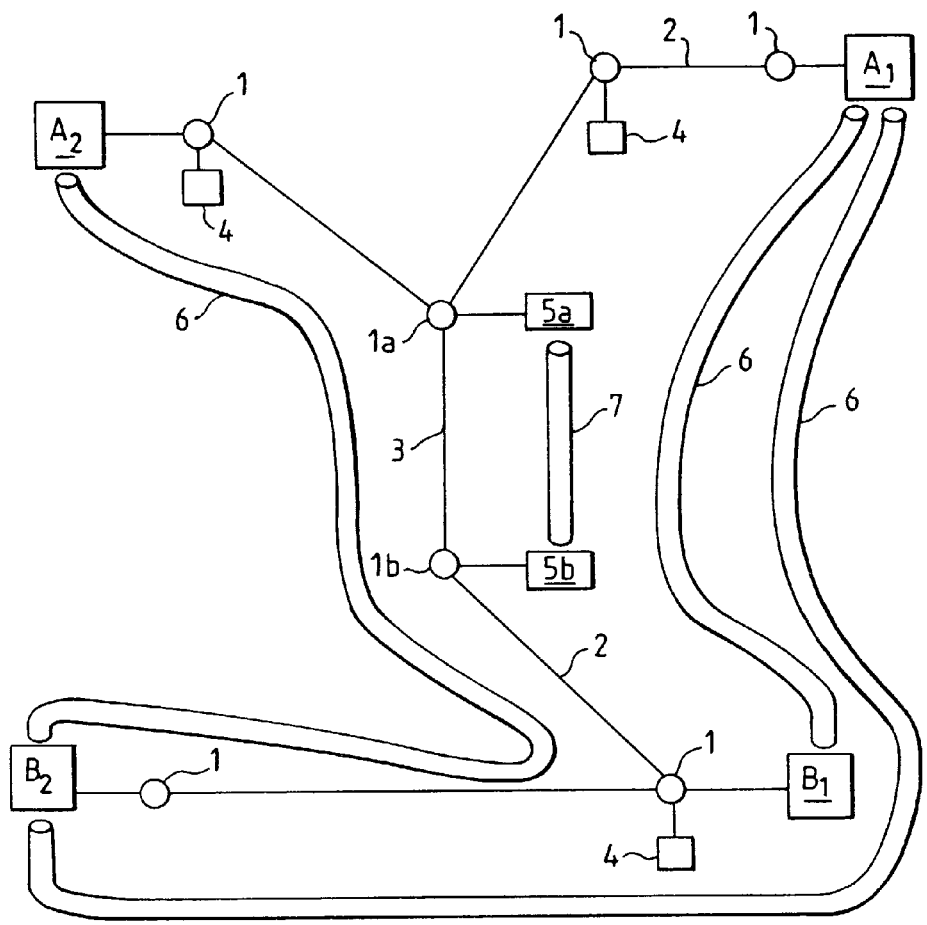
FIG. 1 shows a general architecture of a network according to the invention.

In order to provide for a clearer understanding of the object of the present invention, the following description relates to a specific implementation of the AAL2 protocol to optimize the padding of the basic transmission unit, such as a fixed-size ATM type cell, on arteries in which the bandwidth resources are very scarce (low-bit-rate arteries) without however introducing any excessive delay in telephone communications.

This exemplary implementation of the invention is given by way of an explanation that in no way restricts the scope of the invention. The method can be used in any communications network comprising one or more low-bit-rate arteries where the data to be conveyed are converted for example by means of a compression algorithm, the resulting frames having sizes smaller than the size the cell, which itself is possibly variable, the conveying of the data in the network being done in fixed-size packets, the frames being distributed and multiplexed in these packets by means of an adapted protocol, FIG. 1 describes an exemplary general architecture of a network according to the invention. This network has several switches 1 connected to one another by standard-bit-rate arteries or low-bit-rate arteries. Certain switches comprise an adaptation unit that carries out the steps (2) and (7) of the method described here below. The pair of adaptation units used by a given call is determined by the routing algorithm implemented within the network.

The switches 1a, 1b located at the two ends of a low-bit-rate communications artery 3 are for example also associated with a multiplexer 5 respectively referenced 5a, 5b adapted to the performance of the steps (4) and (5) of the method.

In certain exemplary cases of application, virtual circuits of different types may be used. For example, FIG. 1 represents three end-to-end virtual circuits 6 between users A2-B2, A1-B1, A1-B2 and one virtual circuit 7 between two adjacent multiplexer units 5a, 5b.

An exemplary implementation of the method according to the invention comprises for example at least the following steps:

Information Path

When a call is set up between two terminals Ai and Bj of users of the network shown in FIG. 1, hereinafter called, for reasons of simplicity, "user Ai or user Bj" instead of "terminal of the user Ai or the user Bj", an adaptation unit 4 located on the communications path is assigned to each of the users Ai and Bj communicating with each other. It is also assumed that the call travels through a low-bit-rate artery 3 whose switches 1a, 1b positioned at each of its ends are provided with a multiplexer 5a, 5b.

First Step

The method comprises for example a first step (1), which may be optional. In this step, the speech samples produced by the user A are conveyed to the adaptation unit assigned to it (this is the case of the user A1 in FIG. 1 for example). This transportation is done for example by means of ATM cells according to the AAL1 protocol known to those skilled in the art.

Should the adaptation unit 4 assigned to a user A be attached to the same switch 1 as A (as in the case of the user A2 in FIG. 1), then the adaptation unit 4 can receive speech samples directly without going through a packetization operation, and the step (1) is no longer necessary.

Second Step

The method then comprises a second step (2) implemented in the adaptation unit 4 assigned to the user A. The step (2) comprises for example the following sub-steps:

(2a) collecting the speech samples produced by the user, and then converting them into vocoded frames by using a compression algorithm after a collection step performed, for example, by extracting them from the AAL1 cell produced in the step (1), (2b) forming a packet of "application data" consisting of a fixed number of successive vocoded frames of a given call, to which there may be added, as the case nay be, signalling data needed for the use of these frames by the addressee user.

(2c) forming a packet Pi of the AAL2 protocol (CPS packet Common Part Sublayer packet) consisting of the packet of "application data" and of a CPS header comprising the information required by the protocols, such as the data length indicator field LI, the channel identification field CID, the user-to-user field UUI conveying a piece of information from end to end, the header error correction field HEC;

(2d) inserting the CPS packet thus formed into an ATM cell, for example from the second byte of the cell payload, the first byte being reserved for a field STF required by the AAL2 field, and the bytes following the CPS packet remaining unused (PAD field or padding bytes).

Figure 3:
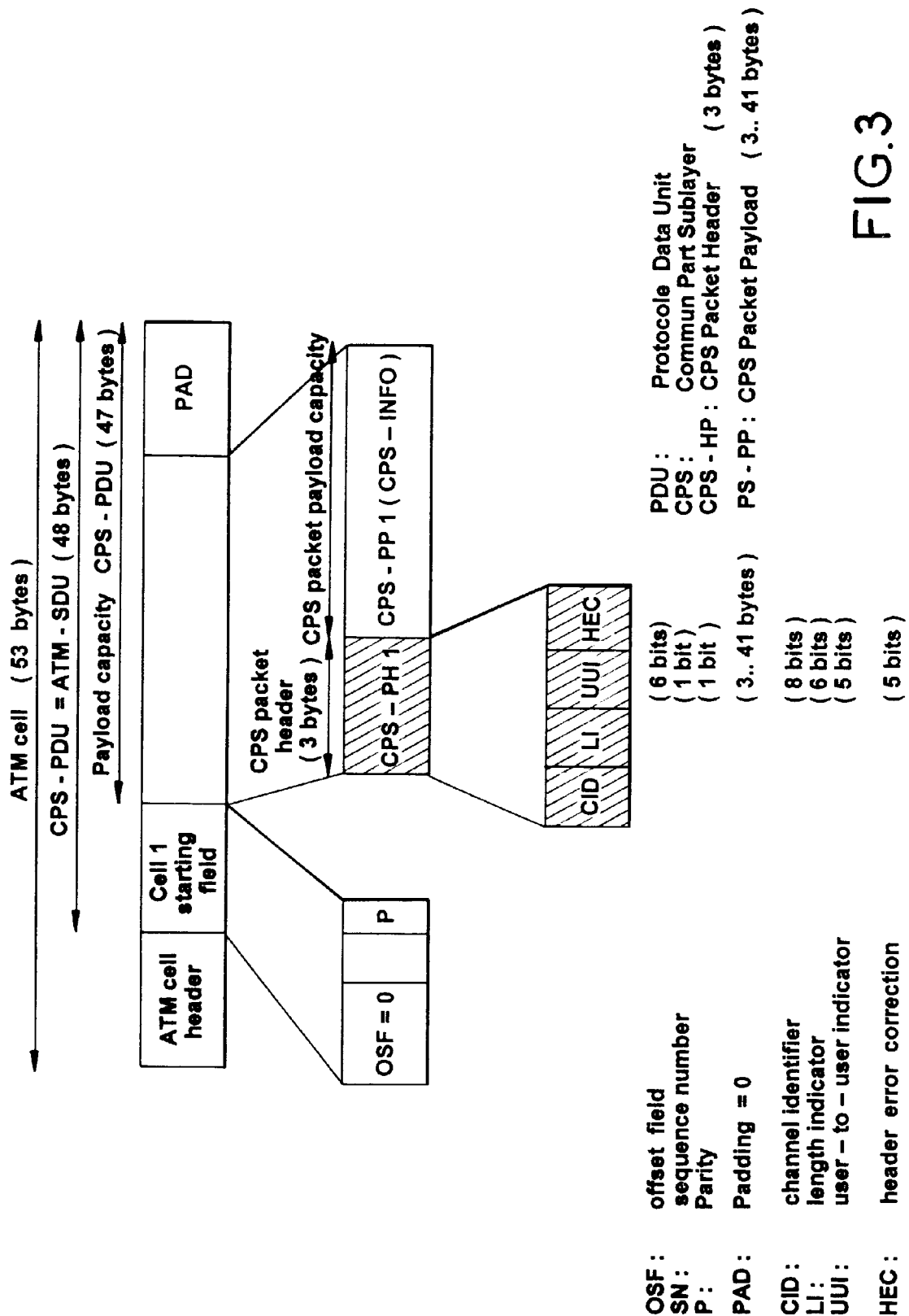
FIGS. 3 and 4 show the packaging of the different levels in the cells at two different steps of the method according to the invention.

FIG. 3 shows the format of the cells resulting from the step (2d). The cells of this format are said to be in non-multiplexed AAL2 mode.

In this exemplary embodiment, the step (2a) comprises the conversion of any sequence of 240 PCM samples, each represented on a byte, into a vocoded frame according to the above-mentioned G.723.1 standard, each frame having a length of 1, 4 or 20 bytes and corresponding to 30 ms of speech. A packet of application data contains two vocoded frames plus one signalling byte, its size varying between three and 41 bytes. The signalling byte indicates the mode of operation of the connection (voice, unencrypted or encrypted fax, compression algorithms used etc) because this operation can vary in time. The adaptation unit 4 is fitted into the switch 1 in the form of a board equipped with a signal processor carrying out the four sub-steps identified here above.

This step (2) is advantageously used to limit the latency time to the duration of a constant number of vocoded frames, namely twice 30 ms in this embodiment.

Third Step

In a third step (3), the cell built during the second step travels through the ATM network up to a switch located downstream from a low-bit-rate artery 3 to be taken by this cell.

Fourth Step

The cell is then processed during a fourth step (4) by the multiplexer 5a belonging to the upstream switch 1a of this low-bit-rate artery, This step consists for example in:

(4a) extracting the CPS packets from the incident cells, (4b) inserting them according to the AAL2 protocol for example in the cells of a single virtual circuit 7 setup between the multiplexers 5a, 5b.

Figure 4:
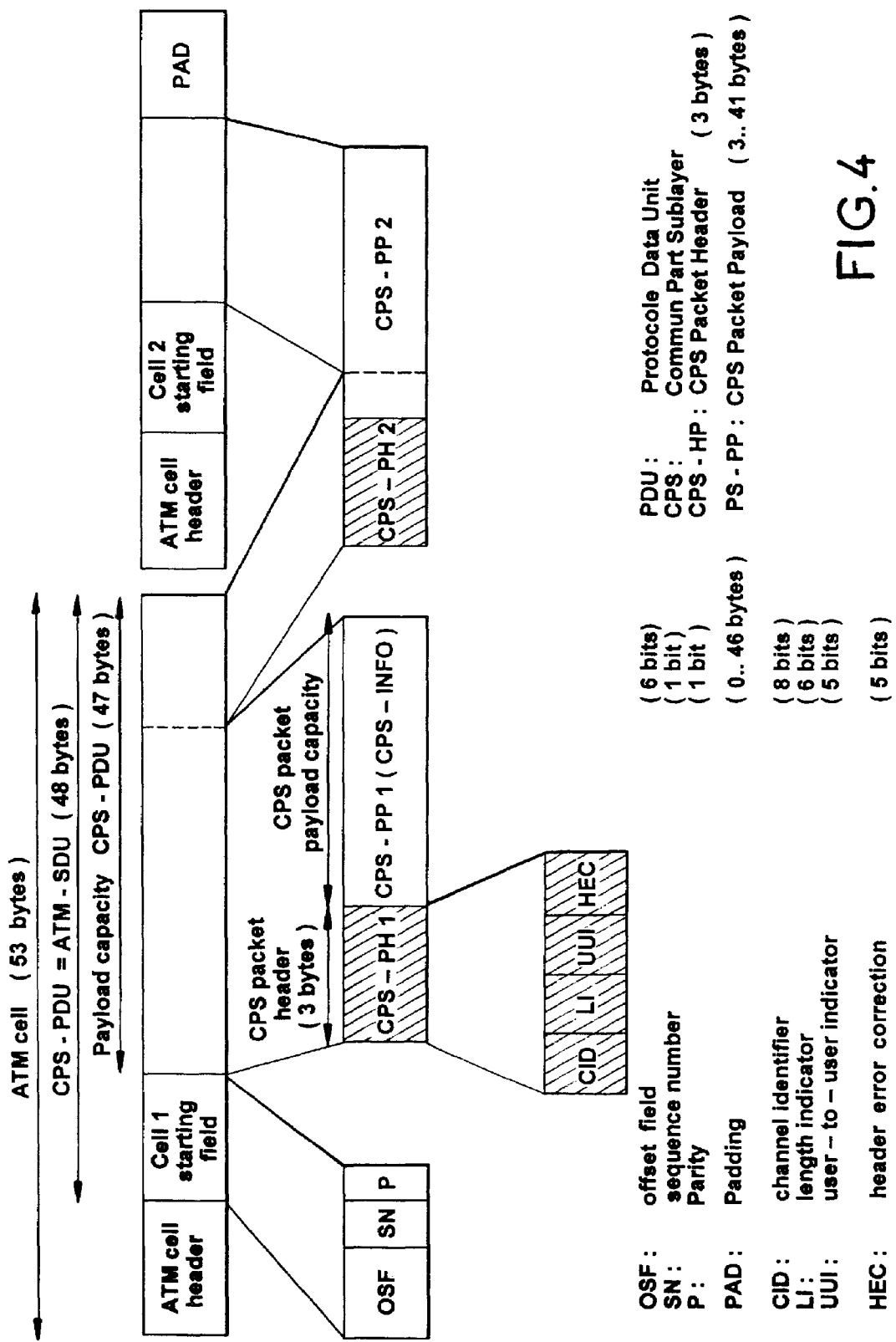

FIG. 4 shows the format of the cells resulting from the step (4b). The cells of this format are said to be in multiplexed AAL2 mode.

During this step, the CPS packets corresponding to distinct calls may be multiplexed in one and the same cell. This corresponds to the most favorable case for optimizing bandwidth use.

According to one embodiment, when it is not possible, because of the activity of the call connections simultaneously present in the line, to have several CPS packets available for sending in a same cell, the cell is sent at the end of an adjustable time lag which is set when the first packet CPS packet is inserted into this cell.

The multiplexer 5a, 5b is for example integrated respectively into the switch 1a, 1b in the form of a board equipped with an ATMizer microprocessor (commercially distributed by the firm LSI Logic) performing the two sub-steps indicated here above.

Fifth Step

The cells of the virtual circuit 7 are received by the downstream switch 1b and processed by the multiplexer 5b integrated into it. This step consists for example of the following:

(5a) extracting the CPS packet from the cells, (5b) determining the connection to which they belong by observing the CID field present in the CPS header, (5c) inserting these packets into the cells of the virtual circuit 6 to which they belong respectively, at the rate of one packet per cell as in the step (2d).

Should the downstream end of the low-bit-rate artery also be the upstream end of another low-bit-rate artery, the step (4b) is performed instead of the step (5c).

When the cell again has to go through a low-bit-rate artery that is not directly connected to the switch in which the coal is currently located, the step (3) (for conveying information in the standard-bit-rate arteries in the network) is for example repeated at the end of the step (5).

Sixth Step

The cell built in the step (5c) travels through the ATM network up to the switch housing the adaptation unit 4 assigned to the user.

Seventh Step

At the adaptation unit 4 allocated to the user B, the following steps are implemented:

(7a) extracting the COPS packet from the cells, (7b) determining the user to which the application data are addressed, (7c) determining whether CPS packets have been lost on the way and generating conventional data to replace the lost packets, (7d) making use of the signalling data inserted in the application data packets, (7e) extracting the vocoded frames from the application data packets, (7f) decompressing the vocoded frames to recreate the initial speech samples, then (7g) transmitting the speech samples directly to the user B if it is directly connected to the switch (this is the case of B1 in FIG. 1).

Eighth Step

This step is optional and may be seen as a counterpart to the step (1). It consists in transporting the speech samples obtained in the step (7f) up to the user B if it is not directly connected to the switch housing the adaptation unit 4 (this is the case of B2 in FIG. 1).

This transportation is done by means of the ATM cells according to the AAL1 protocol.

Routing of Communications and Diversion of the Cells

According to one embodiment, the network implements a routing algorithm known to those skilled in the art, in order to determine the path to be taken by the call connection and to ensure that if this path passes through a low-bit-rate artery, it also passes through a switch equipped with an adaptation unit upstream and downstream with respect to this low-bit-rate artery.

The cells of a call connection that do not go through a low-bit-rate artery cross the network according to the prior art, i.e. they are switched from artery to artery by each switch located in their path.

In the case of a call connection that has to pass through a low-bit-rate artery, this operation is no longer possible and, according to the invention, the cells have to be diverted towards adaptation units and towards multiplexers in the switches which are equipped with them. This is done for example by an alteration in the ATM translation table and by ATM translation capacities implanted in these units 4 and 5.

More specifically, a first translation in the input junctor modifies the VPI/VCI field of the incoming cell and designates the unit 4 or 5 as the destination of the cells. In this unit, the cell undergoes the planned processing operations and a translation table present in said unit determines the VPI/VCI field and the outgoing direction of the cells produced during these processing operations.

If it is an adaptation unit 4, the VPI/VCI field assigned is the identifier determined by the routing.

If it is a multiplexer 5, the VPI/VCI field assigned depends on the direction of the cell: if it is towards a low-bit-rate artery it will be the identifier assigned to the virtual circuit 7 set up between multiplexers, if it is towards a standard line, it will be the identifier determined by the routing operation.

Preservation of Binary Integrity

Figure 2:
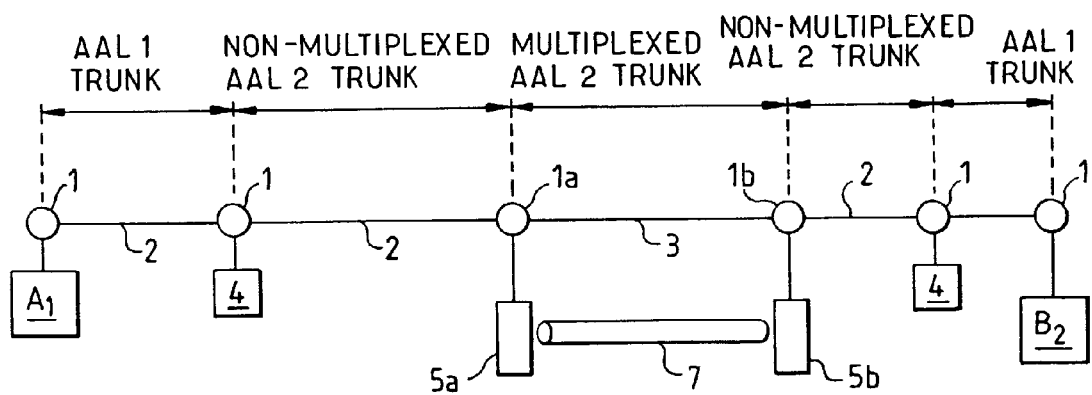
FIG. 2 is a diagram showing the transfer of information between a user A and a user B.

FIG. 2 gives a schematic view of the transmission of a piece of information between a user A1 and a user B2. This piece of information goes through 5 trunks each demarcated by switches 1: these trunks are:

One trunk between the user A1 and the adaptation unit 4 that is assigned to it, AAL1 trunk, One trunk between this adaptation unit 4 (assigned to the user A1) and the upstream multiplexer 5a of the low-bit-rate artery, non-multiplexed AAL2 trunks One trunk between the upstream multiplexer 5a and the downstream multiplexer 5b of the low-bit-rate artery, multiplexed AAL2 trunk, One trunk between the downstream multiplexer 5b and the adaptation unit 4 assigned to B2, non-multiplexed AAL2 trunk.

One trunk between this adaptation unit (allocated to B2) and B2 itself, AAL1 trunk.

On each of these trunks, cells may be lost either through congestion or because of transmission errors causing such damage to the header that it cannot be corrected.

On each AA1 trunk, a field laid down by the AA1 protocol is used to number the cells. This makes it possible, under certain conditions, to detect cell losses and replace the lost cells by a cell containing the samples of a conventional replacement sound motif.

On each non-multiplexed AAL2 trunk, the SN (sequence number) sub-field of the STF field is used for the rough numbering (with one bit only) of the cells, This makes it possible, under certain conditions, to detect cell losses and, optionally, to replace the lost cells by a cell containing a conventional replacement CPS (Common Part Sublayer) field. The CID (channel indicator) field of the header of the CPS packet is rebuilt from the VPI/VCI logic channel identifier present in the cell, but the UUI cannot be regenerated in a simple way.

On each multiplexed AAL2 trunk, the SN sub-field of the STF field is used according to the standard to detect cell losses and process impacted CPS packets.

On all the AAL2 trunks between two adaptation units 4, the UUI field of the header of the CPS packets used, for example to convey a sequence number on five bits, enabling the receiver end to detect the loss of a CPS packet and replace its contents with a packet of conventional replacement application data.

AAL2 Switch

Figure 5:
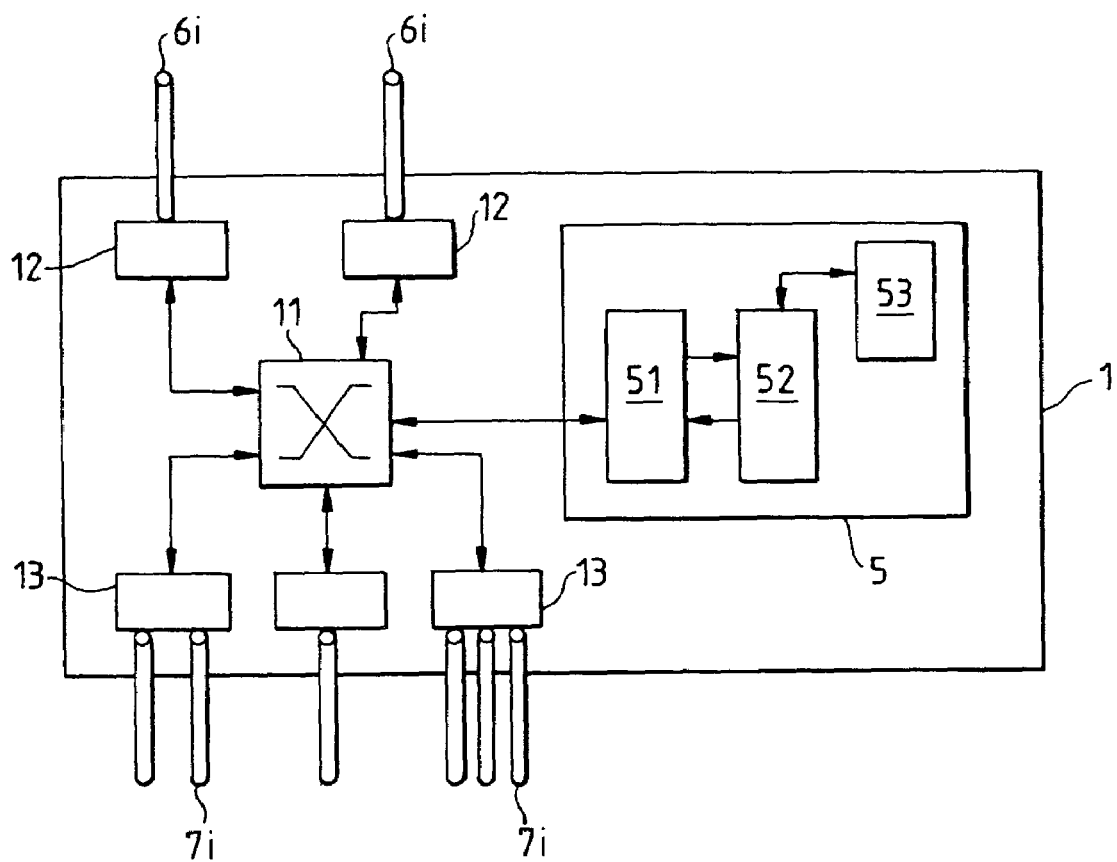
FIG. 5 exemplifies a switch provided with a multiplexer unit according to the invention.

In FIG. 5 describes an exemplary ATM switch equipped with a multiplexer behaving functionally like a CPS packet switch between different virtual lines consisting of ATM connections in multiplexed or non-multiplexed AAL2 mode The switch comprises, for example, a shuffler 11 and line junctors 12 and 13 of which the former are used for the connection of low-bit-rate arteries. Connections 7i in multiplexed AAL2 mode enter the switch through the junctors 12. Connections 6i in non-multiplexed AAL2 mode entered the switches through the junctors 13, The switch is thus provided with a multiplexer 5 connected to the shuffler. The multiplexer 5 comprises for example:

A packetization function 51 for putting the CPS packets in cells and extracting them from the cells, an AAL2 switching function 52 that shunts the CPS packets received from the function 51 to this same function after determining the output virtual line by consulting a correspondence table 53.

A switch of this kind works for example as follows:

When a cell comes into the ATM switch by one of these virtual arteries, the switch sends it to the multiplexer 5 after translation of the VPI/VCI field in the shuffler 11. The multiplexer extracts the CPS packets from the cells received on each of the virtual lines in the function 51 and transmits them to the switching function 52. Depending on the receiving virtual line (identified by the VPI/VCI field of the cells) and depending on the circuit identifier (identified by the CID field of the CPS packet) a switching table 53 gives the output virtual line (identified by the VPI/VCI identifier) and the outgoing direction of the ATM shuffler. The CPS packet is then transferred to the function 51 which is inserted into a cell sent on this artery according to the AAL2 mode chosen for the virtual artery in question.

As an alternative, it is possible that the CID field of the CPS packet coming from the virtual artery in non-multiplexed AAL2 mode is not used because the VPI/VCI of the virtual artery alone is enough to characterize the circuit.

More generally, and without departing from the framework of the invention, the method can be applied in any communications network comprising one or more low-bit-rate arteries as defined here above, the resulting frames having a size smaller than the size of the communications unit of the network that is used to transfer information, and an adaptation layer to multiplex packets of variable length in a cell.

The data to be conveyed are for example multiservice data such as video, voice and other data.

What is claimed is:

1. A method for conveying data in a connection between terminals in a communications network comprising at least one low-bit-rate artery and at least one standard-bit-rate artery, the method comprising:
  at a first end of the low-bit-rate artery,
    receiving a plurality of first basic transmission units from different originating terminals, each first basic transmission unit comprising a packet of application data formed according to a second protocol, wherein the packet of application data comprises a plurality of coded frames and a header, each of the plurality of coded frames comprising data received from the different originating terminals according to a first protocol and converted by a compression algorithm;
    extracting one or more packets of application data from the plurality of first basic transmission units;
    multiplexing the one or more packets of application data received from the different originating terminals by inserting into a second basic transmission unit for transmission via the low-bit-rate artery to a second end of the low-bit-rate artery;
    setting an adjustable time lag for transmission of the second basic transmission unit when a first of the one or more packets of application data is inserted into the second basic transmission unit; and
    at an end of the adjustable time lag, transmitting the second basic transmission unit from the first end to the second end of the low-bit-rate artery;
  at the second end of the low-bit-rate artery,
    extracting the one or more packets of application data from the second basic transmission unit;
    inserting the extracted one or more packets of application data into a third basic transmission unit; and
    transmitting the third basic transmission unit to a terminating terminal.

2. The method according to claim 1, further comprising:
  forming a Common Part Sublayer packet comprising a packet of application data;
  multiplexing the Common Part Sublayer packet into the second basic transmission unit before transmission at the first end of the low-bit-rate artery; and
  demultiplexing the Common Part Sublayer packet at the second end of the low-bit-rate artery.

3. The method according to claim 2, wherein an AAL2 protocol is used when multiplexing the Common Part Sublayer packet into the second basic transmission unit.

4. The method according to claim 1, wherein each of the one or more packets of application data includes a fixed number of successive coded frames.

5. The method according to claim 1, wherein the data received from the different originating terminals is transported from the originating terminals according to an AAL1 protocol.

6. The method according to claim 1, further comprising, when the second end of the low-bit-rate artery corresponds to a first end of an additional low-bit-rate artery, repeating the multiplexing of the one or more packets of application data received from the different originating terminals into a second basic transmission unit for transmission from the first end to a second end of the additional low-bit-rate artery.

7. The method according to claim 1, further comprising using a header of each packet of application data to check the integrity of the data sent between an originating terminal and the terminating terminal in the communications network.

8. The method according to claim 1, wherein the data comprises video or digital voice data.

9. The method according to claim 1, wherein the terminating terminal is configured to determine if a packet has been lost, and if so, the terminating terminal is configured to generate conventional data to replace the lost packet.

10. The method of claim 1, wherein the third basic transmission unit enables the terminating terminal to:
  extract the packets from the third basic transmission unit;
  determine a mode of operation of the connection between first originating terminal and the terminating terminal;
  extract the coded frames from the packet of application data; and
  decompress the coded frames to recreate the data.

11. The method according to claim 10, wherein the packet of application data further includes a signaling byte indicating the mode of operation comprising at least one of voice, fax, or a compression algorithm.

12. An apparatus for data transmission between an originating terminal and a terminating terminal in a communications network comprising at least one low-bit-rate artery and at least one standard-bit-rate artery, comprising:
  a multiplexer device in communication with the at least one low-bit-rate artery and at least one standard-bit-rate artery, wherein the multiplexer device is configured to switch packets of compressed data transmitted in basic transmission units according to an adaptation layer protocol among several virtual lines constituted by connections in multiplexed or non-multiplexed mode, wherein data from the originating terminal transmitted on the at least one standard-bit-rate artery is multiplexed with data from another originating terminal onto the at least one low-bit-rate artery, the data being transmitted over the at least one low-bit-rate artery at an end of an adjustable time lag, the time lag being set when a first packet is inserted in a basic transmission unit; and
  an adaptation unit associated with the terminating terminal, wherein the adaptation unit is configured to:
    extract the packets from the basic transmission units;
    extract the data from the packets;
    determine a mode of operation of a connection between an originating terminal and a terminating terminal using signaling data inserted in the packets and indicating the mode of operation, the mode of operation comprising at least one of voice, fax, or a compression algorithm used to compress the data; and
    decompress the data in order to recreate the data from the originating terminal.

13. The apparatus according to claim 12, further comprising:
  a shuffler configured to transmit first basic transmission units to the multiplexer device for transmission through the at least one low-bit-rate artery and further configured to transparently switch basic transmission units that are not to be transmitted through the at least one low-bit-rate artery, wherein the multiplexer device is further configured to extract the packets from the first basic transmission units and to insert the packets into second basic transmission units for transmission through the at least one low-bit-rate artery, and
  a table configured to determine the at least one low-bit-rate artery over which the packets in the second basic transmission units are to be transmitted.

14. The apparatus according to claim 12, wherein the adaptation layer protocol is an AAL2 protocol.

15. The apparatus according to claim 14, wherein the apparatus is an ATM switch that includes the multiplexer device, and wherein the multiplexer device is configured to switch Common Part Sublayer packets among the several virtual lines constituted by the connections in multiplexed or non-multiplexed mode, the connections comprising ATM connections in multiplexed or non-multiplexed AAL2 mode.

16. The apparatus according to claim 12, wherein the adaptation unit is further configured to determine whether a packet has been lost and to generate conventional data to replace the lost packet.

17. A network configured to convey data between at least two terminals, comprising:
   one or more low-bit-rate arteries;
   one or more standard-bit-rate arteries;
   a multiplexer device in communication with the one or more low-bit-rate arteries and the one or more standard-bit-rate arteries, wherein the multiplexer device is configured to switch packets of compressed data transmitted in basic transmission units among several virtual lines constituted by connections in multiplexed or non-multiplexed mode, wherein data from an originating terminal transmitted on the one or more standard-bit-rate arteries is multiplexed with data from another originating terminal onto the one or more low-bit-rate arteries and is transmitted over the one or more low-bit-rate arteries at an end of an adjustable time lag, the time lag being set when a first packet is inserted in a basic transmission unit; and
   a device associated with a terminating terminal, wherein the device is configured to:
     extract the packets from the basic transmission units;
     extract the data from the packets;
     determine a mode of operation of a connection between the originating terminal and the terminating terminal using signaling data inserted in the packets and indicating the mode of operation, the mode of operation comprising at least one of voice, fax, or a compression algorithm used to compress the data; and
     decompress the data in order to recreate data from the originating terminal.

18. The network according to claim 17, wherein the multiplexer device is incorporated into an ATM switch.

19. The network according to claim 17, further comprising at least two multiplexer devices, wherein a first multiplexer device is positioned at a first end of a low-bit-rate artery and a second multiplexer device is positioned at a second end of the low-bit-rate artery,
   wherein the first multiplexer device is configured to:
     extract a plurality of packets from first basic transmission units received from different originating terminals and to multiplex the extracted packets in a second basic transmission unit of a virtual line between the first end and the second end of the low-bit-rate artery for transmission of the second basic transmission unit from the first end to the second end of the low-bit-rate artery; and
   wherein the second multiplexer device is configured to:
     extract the packets from the second basic transmission unit, determine the terminating terminal to which each of the packets belong, and insert each of the packets into a third basic transmission unit for transmission to the terminating terminal.

20. The network according to claim 17, wherein the device is further configured to determine whether a packet has been lost and to generate conventional data to replace the lost packet.

21. Apparatus for data transmission in a communications network, comprising:
   a first adaptation unit associated with an originating terminal, wherein the first adaptation unit is configured to receive, from the originating terminal, data according to a first protocol, convert the received data into coded frames using a compression algorithm, form a packet of application data comprising a plurality of the coded frames according to a second protocol, and insert the packet into a first basic transmission unit at a rate of one packet per unit for transmission to a first end of a low-bit-rate artery;
   a first multiplexer device associated with the first end of the low-bit-rate artery, wherein the first multiplexer device is configured to extract the packet from the first basic transmission unit and from first basic transmission units received from different originating terminals, and wherein the first multiplexer device is further configured to multiplex the extracted packets into a second basic transmission unit for transmission to a second end of the low-bit-rate artery at an end of an adjustable time lag, the time lag being set when a first packet is inserted in the second basic transmission unit;
   a second multiplexer device associated with the second end of the low-bit-rate artery, wherein the multiplexer device is configured to extract the packets from the second basic transmission unit, determine the terminating terminal to which each of the packets belong, and insert each of the packets into a third basic transmission unit for transmission to the terminating terminal; and
   a second adaptation unit associated with the terminating terminal, wherein the second adaptation unit is configured to:
     extract the packets from the third basic transmission unit;
     determine whether any packet in the basic transmission units has been lost;
     determine a mode of operation of a connection between the originating terminal and the terminating terminal using signaling data inserted in the packets and indicating the mode of operation, the mode of operation comprising at least one of voice, fax, or a compression algorithm used to compress the data;
     extract the coded frames from the packets; and
     decompress the coded frames to recreate the data from the originating terminal.

22. A network configured to convey data between at least two terminals, comprising:
   one or more low-bit-rate arteries;
   one or more standard-bit-rate arteries;
   a first adaptation unit associated with an originating terminal, the first adaptation unit configured to receive data from the originating terminal, convert the received data into coded frames, form a packet of application data comprising a plurality of the coded frames, and insert the packet into a first basic transmission unit for transmission to a first end of a low-bit-rate artery;
   a first multiplexer device associated with an upstream switch at the first end of the low-bit-rate artery, wherein the first multiplexer device is configured to extract the packet from the first basic transmission unit and from a first basic transmission unit received from a different originating terminal, and wherein the first multiplexer device is further configured to multiplex the extracted packets into a second basic transmission unit for transmission to a second end of the low-bit-rate artery at an end of an adjustable time lag, the time lag being set when a first packet is inserted in the second basic transmission unit;
   a second multiplexer device associated with a downstream switch at the second end of the low-bit-rate artery, the multiplexer device configured to extract the packets from the second basic transmission unit, determine the terminating terminal to which each of the packets belong, and insert each of the packets into a third basic transmission unit for transmission to the terminating terminal; and a second adaptation unit associated with the terminating terminal, the second adaptation unit configured to:

extract the packets from the third basic transmission unit;

determine a mode of operation of a connection between the originating terminal and the terminating terminal using signaling data inserted in the packets and indicating the mode of operation, the mode of operation comprising at least one of voice, fax, or a compression algorithm used to compress the data;

extract the coded frames from the packets; and recreate the data from the coded frames.

* * * * *